April 16, 1935.  R. K. HOPKINS  1,997,969
ELECTRIC ARC WELDING METHOD
Filed Jan. 7, 1933
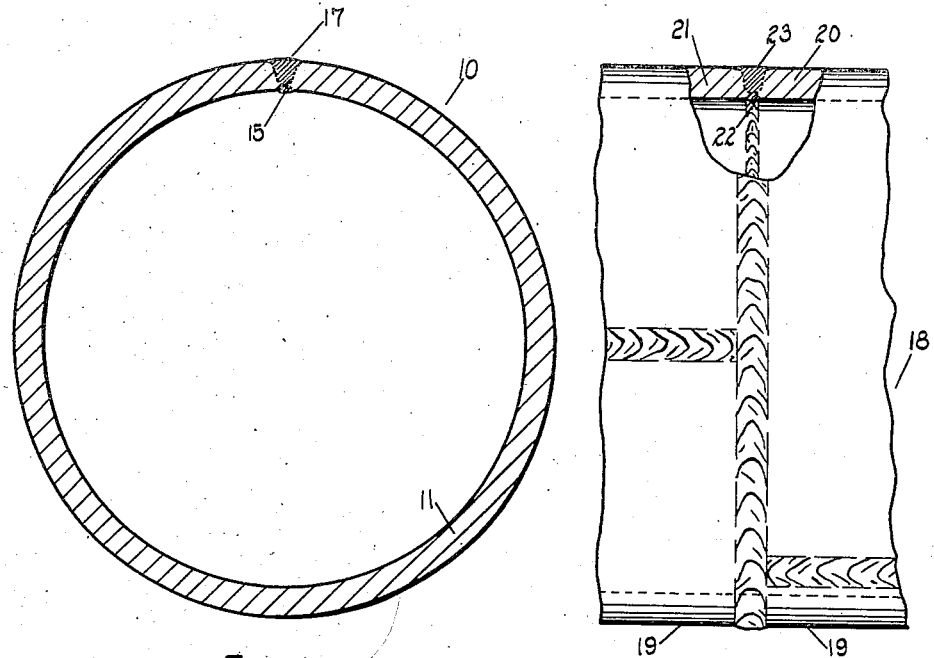
Fig.-1
Fig.-2
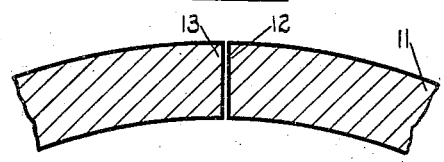
Fig.-3
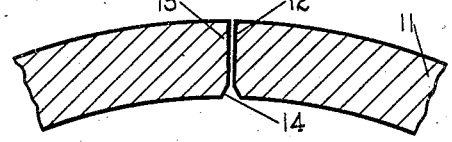
Fig.-4
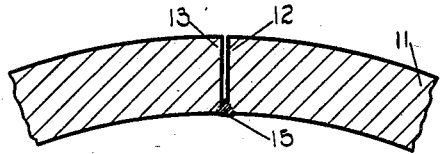
Fig.-5
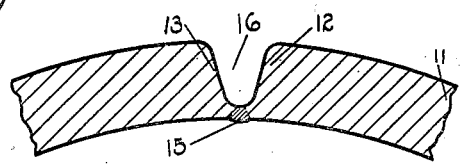
Fig.-6
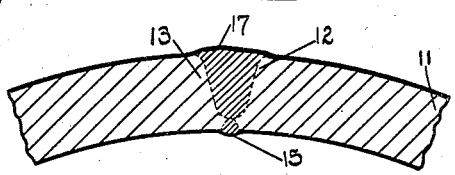
Fig.-7
INVENTOR
Robert K. Hopkins
BY
Virgil F. Davies
ATTORNEY

UNITED STATES PATENT OFFICE 1,997,969

ELECTRIC ARC WELDING METHOD

Robert K. Hopkins, New York, N. Y., assignor to M. W. Kellogg Co., New York, N. Y., a corporation of Delaware Application January 7, 1933, Serial No. 650,605

8 Claims. (Cl. 219—10)

This invention relates in general to the fabrication of articles from flat or shaped metal plates, and in particular to the fabrication of such articles wherein the edges of the component parts are joined by fusion with metal deposited from a fusible electrode by means of an electric arc.

Various methods for fabricating articles from flat or shaped metal plates have been proposed. These methods generally comprise cutting the plates to the proper size; machining, pressing, or otherwise forming the edges of the plates which are to be joined into component parts of welding grooves of desired shape; rolling, or otherwise shaping the plates which require shaping; assembling the plates to form the article or sections thereof; welding the edges to be joined by means of an electric arc to form the completed article or sections thereof; and in case the article is formed in sections, assembling the sections and uniting their contiguous edges by electric arc welding.

Many forms of welding grooves are at present used, generally the edges defining the grooves include extensions or lips which are brought in registry in the assembling of the article to form the bottom or floor of the groove. The machining, pressing, or other operation used in shaping the edges of the plates is time consuming and represents a good portion of the fabrication cost of the article. By reason of the extensions or lips of the edges of the plates the assembly step is also very expensive and time consuming since it is necessary to bring the extensions or lips of the edges of the plates into accurate registry in order to carry out the subsequent welding with some degree of facility. The assembly step requires a great deal of rigging even when the plates are comparatively thin; when the plates are thick and unyielding the difficulties are multiplied many fold as is also the cost of the finished article.

By reason of the necessity of accurate registry of the extensions or lips of the groove defining edges of the plates it is generally necessary to more accurately align the component parts of the articles than called for by the tolerance allowances.

This invention has for an object a method of fabricating articles out of metal plates which dispenses with the step wherein the edges of the plates are formed with component parts of welding grooves before the shaping of the plates.

This invention has for a further object a method of fabricating articles out of metal plates in which the rigging during the assembly of the component parts of the articles is a minimum and the accuracy of the alignment of the component parts is governed solely by the tolerance allowances.

This invention also has for an object a method of fabricating articles out of metal plates in which the welding grooves are formed by chipping and/or burning out metal after the component parts of the article have been assembled.

Other objects and advantages of the invention will be apparent from a consideration of the following detailed description taken with the accompanying drawing, in which, Fig. 1 is a sectional end view of a cylindrical vessel fabricated in accordance with my invention showing a longitudinal weld in cross section, Fig. 2 is a part sectional front elevation of a cylindrical vessel made up of a plurality of sections fabricated in accordance with my invention and showing a circumferential weld partly in section, and Figs. 3–7 are sectional views illustrating the various steps of the method of my invention.

The method of my invention is applicable to the fabrication of all types of articles at present made from metal plates and joined by electric arc welding. It is not limited to plates of any particular thickness but finds its most useful application in connection with the fabrication of articles made from thick plates as then its savings and advantages are most marked. The method of the invention is, therefore, ideally suited to the fabrication of heavy walled open ended cylindrical vessels such as penstocks and the like, and of heavy walled closed vessels such as the towers, columns, and the like used in the cracking of petroleum oil.

The cylindrical article 10 of Fig. 1, which for instance may be an open ended cylindrical vessel, is shown as made up of a single plate 11 but may be made up of a plurality of plates 11. In fabricating article 10 the plate or plates 11 are cut to the proper size and then rolled or otherwise bent to the cylindrical shape. No machining or other shaping of the edges of plate or plates 11 to form the component parts of welding grooves is carried out before the bending operation. The shaped plate or plates 11 are then suitably rigged and acted upon until the edges 12 and 13, or the pairs of edges 12 and 13, if a plurality of plates 11 are used, to be joined abut each other as shown in Fig. 3. Since edges 12 and 13 do not have any lips or other groove forming extensions it is not necessary to align edges 12 and 13 more accurately than is required by tolerance allowances.

A shallow welding groove 14 is then cut on the inside face of article 10 along the edges 12 and 13 or along each pair of edges 12 and 13, if a plurality of plates 10 are used, by means of a chipping tool. If desired groove or grooves 14 may be formed by other means as for instance by means of a burning torch. If the latter means is employed the surfaces of groove or grooves 14 are cleaned of slag and scale by chipping. The completed welding groove or grooves 14, shown in Fig. 4, are then filled with fusing metal by means of an electric arc. Although this invention is not limited to any particular kind of arc welding I prefer to deposit the bead 15 by means of a covered fusible electrode. As shown in Fig. 5 after bead or beads 14 have been formed the edges 12 and 13 of plate or plates 11 are sufficiently joined to prevent relative movement so that vessel 10 may be handled as required by the fabrication steps which follow without disassembly of vessel 10.

A burning torch, preferably of high capacity is then played over edges 12 and 13 to burn away metal therefrom and produce main welding groove or grooves 16 of desired configuration. The surfaces of main welding groove or grooves 16 are cleaned, by chipping or otherwise as is common in the art, to prepare groove or grooves 16 for depositing therein, the metal of the main weld 17 by electric arc welding. The deposition of weld metal in groove or grooves 16 may be carried out in any desired manner but I prefer to use electric arc welding methods which employ a covered fusible electrode. Fig. 7 shows the completed weld. The cylindrical article 10 thus formed may be used as a short conduit.

If it is desired to form a penstock or the like open ended vessel, as for instance the vessel 18 fragmentarily shown in Fig. 2 which comprises a plurality of end to end welded sections 19 similar to article 10 the fabrication of which has just been described, the required sections 19 are fabricated in accordance with the method of my invention above described. Sections 19 are then assembled in end to end relation, and after being rigged are acted upon to bring the pairs of edges 20 and 21 to be joined (one pair only being shown) in abutment. Since edges 20 and 21 have not been machined or otherwise worked upon to form lips or other groove forming projections the accuracy of alignment of sections 19 is determined solely by the tolerance allowed.

As before, a shallow groove is formed on one face of edges 20 and 21 and a bead 22 of fusing metal deposited therein by means of an electric arc to unite sections 19. After this is done a main welding groove of desired shape is then burned on the other face of edges 20 and 21 and cleaned by chipping or otherwise to accommodate the metal of the main weld 23. The thus united sections 19 form an integral vessel 18 which is in every way the equal of similar vessels fabricated in accordance with the prior methods.

When a closed ended vessel, such as a tower, column, and the like used in the cracking of petroleum oil, is to be fabricated the body portion of such vessel is formed by the method just described. Suitably shaped ends are then positioned at the ends of the vessel and welded thereto by means of circumferential welds carried out as described in connection with the fabrication of vessel 18. Here also the accuracy of the alignment of the vessel and its ends is determined solely by the tolerance allowance and is not dependent on the alignment of welding groove forming projections on the edges to be joined.

It is to be noted that, although in the above description of the method of my invention I have described the fabrication of the closed ended vessel as carried on in three major steps, that is to say, forming of article 10, then of vessel 18 and finally of the closed ended vessel, the novel method is not limited to this procedure and if desired all three of these major steps can be carried out as a single major step. It is also to be noted that in the fabrication of article 10, when a plurality of plates 11 are used, it is not necessary to bend plates 11 before uniting them. If desired the plates 11 required to form article 10 may be united by means of longitudinal welds 17 prior to bending and the resulting single plate bent as required.

I claim:

1. The method of fabricating articles from plate sections, which comprises assembling the plate sections with the edges to be joined in abutting relation, forming a shallow welding groove on one side of said plate sections along each pair of edges to be joined, depositing fusing metal in said groove by means of an electric arc, forming a main welding groove on the other side of said plate sections along each pair of edges to be joined, and depositing fusing metal in said main welding groove.

2. The method of fabricating articles from plate, which comprises cutting the plate or plates out of which the article is to be fabricated to the proper size, assembling said plate or plates with the edges to be joined in abutting relation, forming a shallow welding groove on one face of said plate or plates along each pair of edges to be joined, depositing fusing metal by means of an electric arc in said groove or grooves, forming a main welding groove on the other side of said plate or plates along each pair of edges to be joined, and depositing fusing metal by means of an electric arc in said main welding groove or grooves to unite said plate or plates.

3. The method of fabricating articles from plate, which comprises cutting the plate or plates to the proper size, shaping said plate or plates as required to produce the article, assembling said plate or plates with the edges to be joined in abutting relation, forming a shallow welding groove on one face of said plate or plates along each pair of edges to be joined, depositing fusing metal by means of an electric arc in said groove or grooves, forming a main welding groove on the other side of said plate or plates along each pair of edges to be joined, and depositing fusing metal by means of an electric arc in said main welding groove or grooves.

4. The method of manufacturing cylindrical vessels from plate, which comprises bending one or more plate sections to form a cylinder, assembling said plate sections with the edges to be joined in abutting relation, forming a shallow groove on one face of said plate sections along each pair of edges to be joined, filling said groove or grooves with weld metal by means of an electric arc, forming a main welding groove on the other face of said plate sections along each pair of edges to be joined, and filling said main groove or grooves with weld metal by means of an electric arc.

5. The method of manufacturing cylindrical vessels made up of a plurality of cylindrical sections, which comprises manufacturing the cylindrical sections required, assembling said sections in end to end relation with the edges to be joined in abutment, forming a shallow welding groove on one face of said sections along each pair of edges to be joined, filling said groove or grooves with weld metal by means of an electric arc, forming a main welding groove on the other face of said sections along each pair of edges to be joined, and filling said groove or grooves with weld metal by means of an electric arc, forming a main welding groove on the other face of said sections along each pair of edges to be joined, and filling said main groove or grooves with weld metal by means of an electric arc.

6. The method of manufacturing cylindrical vessels made up of cylindrical sections welded end to end, which comprises forming each of the required cylindrical sections by bending one or more plate sections to form a cylinder, bringing the contiguous edges of said plate sections into abutment, forming a shallow welding groove on one side of said plate sections along each pair of edges to be joined, depositing fusing metal in said groove or grooves by means of an electric arc, forming a main welding groove on the other side of said plate sections along each pair of edges to be joined, depositing fusing weld metal in said main groove or grooves by means of an electric arc; and forming said sections into an integral cylindrical vessel by assembling said sections in end to end relation with the edges to be joined in abutment, forming a shallow welding groove on one face of said cylindrical sections along each pair of edges to be joined, depositing fusing weld metal in said shallow groove or grooves by means of an electric arc, forming a main welding groove on the other face of said cylindrical sections along each pair of edges to be joined, and depositing fusing weld metal in said main groove or grooves by means of an electric arc to complete said vessel.

7. The method of manufacturing a closed ended cylindrical vessel, which comprises bending one or more plate sections to form a cylinder, bringing the contiguous edges of said plate sections into abutment, forming a shallow welding groove on one face of said plate sections along each pair of edges to be joined, depositing fusing metal in said groove or grooves by means of an electric arc, forming a main welding groove on the other face of said plate sections along each pair of edges to be joined, depositing fusing metal in said main groove or grooves by means of an electric arc, forming the end members of said vessel, assembling said vessel with the edges of said end members in abutment with the edges of said cylinder, forming shallow welding grooves on one face of said cylinder and end members along the abutting edges of said cylinder and end members, depositing fusing metal in said shallow grooves by means of an electric arc, forming main welding grooves on the other face of said cylinder and end members along the abutting edges of said cylinder and end members and depositing fusing metal in said main grooves to complete said vessel.

8. The method of manufacturing a closed ended cylindrical vessel made up of a plurality of cylindrical sections, which comprises forming the cylindrical sections, forming the end members of the vessel, assembling the vessel with the contiguous edges of said cylindrical sections in abutment and with the end edges of said cylindrical sections in abutment with the edges of said end members, forming a shallow welding groove on one face of said vessel along each pair of edges to be joined, filling said welding groove with fusing metal by means of an electric arc, forming a main welding groove on the other side of said vessel along each pair of edges to be joined, and filling said main welding grooves with fusing metal by means of an electric arc to complete said vessel.

ROBERT K. HOPKINS.